United States Patent Office 3,353,925
Patented Nov. 21, 1967

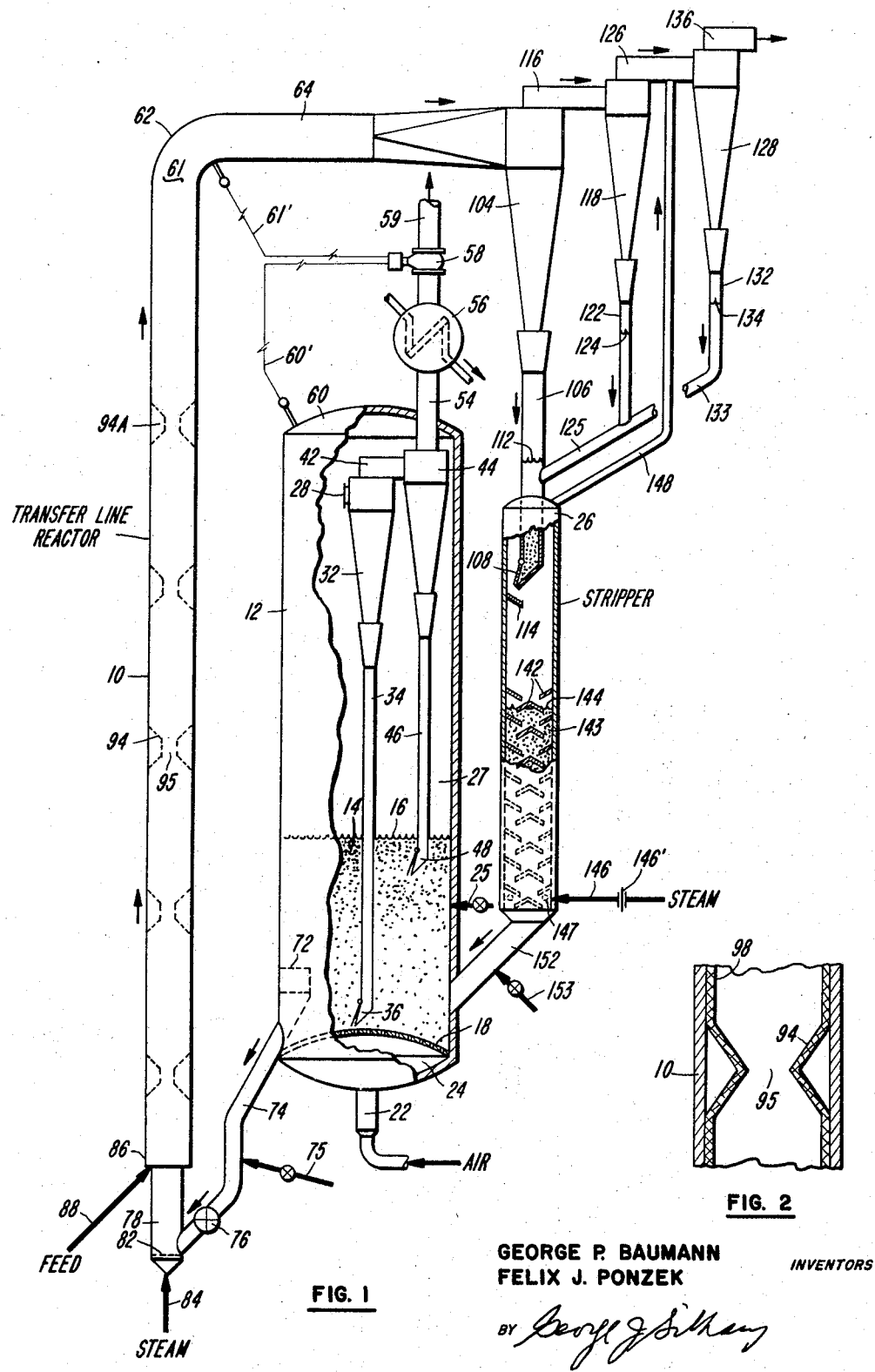

3,353,925
APPARATUS FOR CONVERSION OF HYDROCARBONS
George P. Baumann, Sparta, and Felix J. Ponzek, Morris Township, Morris County, N.J., assignors to Esso Research and Engineering Company, a corporation of Delaware
Original application May 23, 1962, Ser. No. 197,087, now Patent No. 3,261,776, dated July 19, 1966. Divided and this application Nov. 8, 1965, Ser. No. 506,645
4 Claims. (Cl. 23—288)

The present application is a division of Baumann et al. application Serial No. 197,087 filed May 23, 1962, now U.S. Patent 3,261,776.

This invention relates to the catalytic conversion of hydrocarbons and more particularly relates to the fluid catalytic cracking of hydrocarbons.

Fluid catalytic cracking units are well known in the art and in commerce but these units have mostly been of large size for big refineries. To construct or design a small catalytic cracking unit it is not possible to merely reduce the capacity of a large unit because the erected cost per barrel of feed then increases.

According to the present invention, a small catalytic cracking unit can be designed and erected at a cost of about one-third that of a similar sized commercial model reduced to the small unit size.

With the present invention the art is taught a simplified apparatus and process requiring a minimum of equipment and control to safely carry out the cracking operation. The simplified catalytic cracking unit comprises a packaged, low-cost unit which can be installed at any location and which requires a minimum of field construction and erection time. This is accomplished by utilizing prefabricated packages of the major unit components which require only bolting up of flanges for assembly in the field. The unit is completely fabricated in the shop and unit components are packaged so that the unit is suitable for installation at any location. The present design differs considerably from conventional catalytic cracking units in order to minimize investment costs. All of the equipment including an external stripper vessel is mounted on and supported from the regenerator vessel so that conventional support structures are eliminated.

The unit of the present invention has been developed for refineries requiring less than about 20,000 barrels per day (b./d.) cracking capacity. According to this invention a flexible design is provided which can be adapted to catalytic cracking units ranging in size from about 1,000 b./d. to about 20,000 b./d. Simplicity of construction and a simplified process are provided requiring a minimum of equipment and control to safely carry out the cracking operation.

The present design includes a transfer line reactor which empties directly into the first of three solids separation devices which are externally arranged. The separated solids are introduced into the upper portion of an external stripper vessel through a single common line provided at its lower end with sealing means to prevent reverse flow of catalyst or gaseous material. The stripped catalyst particles are passed through an unobstructed line into the bottom portion of a regenerator.

The regenerated catalyst particles are then passed to the bottom portion of a fluidization section which leads into the bottom portion of the transfer line reactor where preheated oil feed is also introduced. The suspension of hydrocarbon feed vapors and catalyst particles pass up through the transfer line reactor to effect cracking of the hydrocarbon oil feed.

There is no slide valve for controlling the flow of spent catalyst particles to the regenerator but there is a manually operable slide valve in the line leading to the transfer line reactor for coarse control of flow of regenerated catalyst particles to the transfer line reactor. An automatic operating pressure control system is provided between the transfer line reactor and the regenerator in connection with a stack valve in the flue gas line leading from the regenerator.

In the drawing:
FIG. 1 represents a schematic showing of the entire unit adapted for carrying out the process of the invention; and
FIG. 2 represents an enlarged vertical cross section of a portion of the transfer line reactor to illustrate how the contacted devices are made.

Referring now to the drawing, the reference character 10 designates a vertically arranged elongated cylindrical transfer line reactor. Disposed alongside the transfer line reactor 10 is a vertically arranged cylindrical regenerator vessel 12 which is of a larger diameter and shorter length than the transfer line reactor. As shown in the drawing the regenerator vessel 12 contains a dense fluidized turbulent bed of finely divided catalyst particles 14 having a level indicated at 16 which is in the lower portion of the regenerator vessel 12.

Arranged in the bottom of the regenerator vessel 12 is a distribution grid 18 which is convex upwardly. Air or other oxygen-containing gas is introduced through line 22 into the bottom portion of the regeneration vessel 12 into the space 24 below the distribution grid 18. The air or other oxidizing gas passes upwardly through the dense bed to fluidize the solid particles and to maintain them in a fluidized condition. The superficial velocity of the gas flowing upwardly through the vessel 12 is between about 1.5 and 3.0 feet per second. The temperature during regeneration may be between about 1000 and 1200° F. The pressure in the regenerator may be between about 6 and 14 p.s.i.g. The temperature in the regenerator may be increased by introducing combustible oil into the regenerator through line 25.

The catalyst is any suitable cracking catalyst such as acid treated clays or the like and/or synthetically prepared silica-alumina, silica-magnesia, silica-alumina-magnesia and other well known or conventional cracking catalysts. The silica-alumina catalyst may contain up to about 50% alumina.

Using silica-alumina catalyst containing 25% alumina by weight and with the catalyst being mostly of a size between about 0 and 160 microns with most of the particles being between about 20 and 80 microns, the density of the fluidized bed 14 in the regenerator 12 will be between about 20 and 40 lbs. per cubic foot, the density of the suspension passing upwardly through the transfer line reactor 10 will be between about 2 and 10 lbs. per cubic foot and the density of the fluidized bed in the stripping vessel 26 will be between about 25 and 50 lbs. per cubic foot.

The regeneration gases as they leave the dense fluidized bed 14 contain entrained solids in the dilute phase 27 superimposed on the dense phase and these gases are passed through inlet 28 into the first solids separating device 32 which may be any suitable type of solids separating means such as a cyclone separator. The separated solids pass into the dipleg 34 which extends down into the dense fluidized bed 14 and is provided with a sealing means such as a trickle or flapper valve 36 at its lower outlet end. Instead of a trickle valve, a seal pot such as shown in U.S. Patent No. 2,656,242 or J-bends or U-bends as shown in U.S. Patent No. 2,815,268 may be used. The separating means 32 is arranged inside the upper portion of the regeneration vessel 12.

The separated gases pass overhead through line 42 and into a second solids separating means such as cyclone separator 44 within the regenerator 12 for separating an additional amount of catalyst particles from the regeneration gases. The separated solids pass down through the vertical dipleg 46 which is shown as shorter than dipleg 34 and preferably dips down below the surface or level 16 of the dense fluidized bed 14 of the catalyst in the regeneration vessel 12 for only a short distance to return the catalyst particles to the fluid bed 14. The lower outlet end of dipleg 46 is provided with sealing means which may be a trickle valve 48 or other sealing means as above described.

The outlet line from the second solids separating means 44 is shown as a vertical line 54 extending up through the top of regenerator vessel 12. If desired, the hot flue gases can be passed through a waste heat boiler 56 or the like for producing steam, but this is not necessary to the process. The flue gases are then passed through differential pressure control valve 58 and out to the atmosphere through line 59. To prevent or control afterburning in the dilute phase of the regenerator 12 or in lines 42 and 54, water may be sprayed into the dilute phase 27 or steam may be intermittently or continuously introduced into line 42 or 54, or both, between the cyclone separators 32 and 44. The pressure differential recording control system is conventional and available from any instrument manufacturer. This system controls valve 58 in response to the differential pressure between the reactor and regenerator.

The pressure differential control valve 58 is connected to the top of the interior of the regenerator vessel 12 at 60 by a line diagrammatically shown at 60' and with the top of the interior of the transfer line reactor 10 at 61 through a line diagrammatically shown at 61'. The pressure drop across the transfer line reactor is automatically controlled by minor adjustments effected by the differential pressure control associated with stack valve 58 as will be hereinafter pointed out in greater detail. The transfer line reactor 10 has a 90° large radius bend at its upper end at 62 and a horizontally extending line 64 leading to the solids separating system to be later described in greater detail.

The regenerated catalyst particles are withdrawn from the dense fluidized bed 14 through the internal submerged well 72 formed at one side at the lower portion of the interior of the regenerator vessel 12 above grid 18 and the regenerated catalyst is introduced into standpipe 74 provided with one or more fluidizing lines 75. The standpipe 74 is provided with a manually operable slide valve 76 to be set to deliver approximately the desired amount of catalyst particles to be introduced into the transfer line reactor 10.

The catalyst is passed through the lower portion of the standpipe 74 and is introduced into a vertically arranged cylindrical injection section 78 provided with a distribution grid 82 at its bottom portion. The standpipe 74 discharges catalyst above the distribution grid 82. Fluidizing gas such as steam is introduced through line 84 below the distribution grid 82 for passage therethrough to fluidize the catalyst in the section 78. The superficial velocity of the upflowing steam in section 78 may be between about 2 and 8 feet per second.

At the upper end of the section 78 the transfer line reactor 10 is of a greater diameter than the injection section 78 as shown at 86 and the upper end of section 78 is swaged out to a diameter equal to that of the reactor 10. Preheated oil feed with or without added steam is introduced through line 88 into the bottom portion of the transfer line reactor 10 for admixture with the upflowing suspension of catalyst particles in steam from the injection section 78. Preferably the oil is injected through nozzles into the bottom of the transfer line reactor in the swaged portion.

The oil feed is atomized and vaporized and mixed with the catalyst particles so that the suspension of catalyst particles in oil vapor passes upwardly in the transfer line reactor 10 at a velocity between about 10 and 40 feet per second. The density of the catalyst suspension passing up through reactor 10 is between about 2 and 15 lbs./cu. ft. The catalyst-to-oil ratio by weight to the reactor 10 may be between about 5 and 15. The w./hr./w. in the reactor may be between about 25 and 100.

At spaced elevations along the transfer line reactor 10 there are provided Venturi-shaped contacting devices 94. Five of these devices are shown in FIG. 1 but more or less may be used if desired. The velocity at the throat 95 of the contacting devices 94 is between about 15 and 60 feet per second. The contacting devices insure cocurrent contacting between the solid and vaporous materials and in particular the mainly solids containing stream which passes downwardly along the walls and the main stream or suspension of solid catalyst passing up through the center of the transfer line reactor. By staging or spacing the contacting devices as shown in the drawing the possibility of forming a long back mixing solids path is eliminated.

As shown in FIG. 2 the contacting devices 94 are fabricated by contracting the hexmesh refractory lining 98 to form the Venturi type throat 95 which of course is circular but of a smaller diameter than the diameter of the transfer line reactor 10. The hexmesh lining 98 is a commercial refractory support made of carbon steel and of open mesh. The hexmesh lining is arranged in place in the reactor 10 and then filled with dense refractory material.

The temperature during cracking in reactor 10 may be between about 850 and 1100° F. The pressure in the transfer line reactor 10 may be between about 5 and 20 p.s.i.g. The oil feed to be cracked may be any suitable feed such as gas oils, heavy naphtha, or reduced crudes or heating oils.

The vaporous cracked products and the catalyst particles now containing carbon or coke deposited during the cracking reaction flow upwardly as a suspension and pass through the elbow 62 and then through horizontal line 64 directly into the first solids separating means 104 which may be any suitable solids separating means and which is shown in the drawing as a cyclone separator. The major portion of the catalyst particles are separated from the cracked vapors in a dry separation and the separated catalyst solids pass down into the depending dipleg 106 which extends down through the top of elongated vertically arranged cylindrical stripper vessel 26 and arranged alongside regenerator 12. The outlet end of the dipleg 106 extends only a relatively short distance within the upper portion of the stripper vessel 26. The dipleg 106 is provided with sealing means such as a trickle valve or flapper valve 108 or the like as above pointed out in connection with the previously described diplegs.

The trickle valve is shown on the drawing as having its outlet end extending to one side of the vertical axis of the stripper to be normally closed and so maintain a seal on the cyclone separator 104 to prevent reverse catalyst flow and also gas flow by providing a positive shutoff. The valve in the lower portion of the dipleg 106 maintains a body of separated catalyst solids up to the level 112. As the level 112 builds up sufficient head or pressure is built up to open the trickle or flapper valve 108 and to discharge the spent catalyst into the top of the stripper. Catalyst from the lower end of the dipleg 106 discharges through valve 108 preferably toward and onto downwardly inclined baffle 114 in the upper portion of stripper vessel 26.

The separated reactor vapors pass overhead from the separating means 104 through line 116 into a second solids separating means such as cyclone separator 118 for separating additional solid catalyst particles from the vapors. These separated catalyst particles are passed to dipleg 122 which is of a smaller diameter than dipleg 106 and which empties into inclined line 125 which discharges into dipleg 106 at a region above the top of the stripper vessel 26 and below the level of solids 112 in the dipleg 106.

The separated hot reaction products pass overhead through line 126 to a third solids separating means 128 for further removing catalyst particles from the reaction vapors and these separated solids pass to dipleg 132 which is also smaller than dipleg 106 and which discharges into inclined line 133 forming an extension of line 125 so that both of the second and third solids separating means discharge the separated solids into the dipleg 106 of the primary solids separating means. The solids in dipleg 132 have a level indicated at 134 which is at a higher level than the level 124 in dipleg 122 and the level 112 in dipleg 106 to compensate for the differences in pressure between the successive solids separating means.

The separated reaction vapors pass overhead through line 136 and are preferably passed to a fractionator or the like to separate gases from motor fuels such as gasoline. The material or hydrocarbons higher boiling than gasoline form recycle oil which may be at least in part recycled to the oil feed inlet 88.

The stripper vessel 26 is arranged externally of the reactor 10 and regenerator 12 and at one side of the regenerator and is provided in about its lower half with contacting devices 142 such as discs and doughnuts. A body 143 of dense fluidized solids having a level indicated at 144 is maintained in the stripper vessel 26. This level 142 is higher than the level 16 in the regenerator vessel 12 and provides the necessary pressure for passing the stripped catalyst from the bottom portion of the stripper vessel 26 into the bottom portion of the regenerator 12 as will be presently described.

Stripping gas such as steam at a substantially constant flow rate is controlled by a fixed restriction orifice 146' is passed through line 146 into a circular distributor 147 at the bottom of the stripper. The stripping gas passes upwardly through the stripper vessel 26 at a superficial velocity between about 0.5 and 2.0 feet per second to displace the entrained and adsorbed hydrocarbons from the catalyst particles. The stripping gas leaves the top of the stripper through line 148 which is a pressure balance line and which discharges into the outlet pipe 126 of the second stage solids separating device 118. The pressure in the top of the stripper and in outlet line 126 from the secondary cyclone separator 118 is about the same. In this way the stripped-off hydrocarbon and any entrained catalyst can be recovered, the hydrocarbon passing on to the fractionator and the entrained catalyst being separated in the last solids separating stage or means 128.

The lower pressure in the solids separating means makes the stripper pressure less than that in the regenerator 12 to create a difference in catalyst levels 144 and 16 as previously described. The higher stripper level 144 combined with the velocity of the catalyst particles leaving the stripper 26 through line or standpipe 152 normally insures against any air flow from the regenerator into the stripping vessel 26. Standpipe 152 is preferably provided with one or more aeration or fluidizing lines 153 for introducing steam or the like for maintaining the catalyst particles in fluidized condition.

The fluidized bed 143 and fluidized catalyst in standpipe 152 form a continuous colume of fluidized solids capable of producing pressure at the bottom of the column. This column communicates with the dense fluidized bed 14 of catalyst in the regenerator 12 to form a U-bend having unequal arms in length and containing dense fluidized catalyst particles. The level 144 of the fluidized bed 143 in the stripping vessel 26 is higher than that at 16 in the regenerator 12 and this together with the pressures in the regenerator and the stripping vessel causes flow of catalyst from the stripping vessel to the regenerator without requiring the use of a slide valve or other similar control valve or device in standpipe 152.

The standpipe 152 is unobstructed and of substantially uniform diameter.

The stripped catalyst particles leave the bottom of the stripping vessel 26 through standpipe 152 as a dense fluidized mixture having a density between about 30 and 45 lbs. per cubic foot.

The pressure normally above the fluidized solids level in the stripper vessel 26 is less than that in the regenerator vessel 12 above the dense bed 14 and in order to have the fluidized solids flow from the stripper vessel 26 to the regenerator vessel 12, it is necessary to have the level 144 of the fluidized bed in the stripper vessel 26 sufficiently above the level 16 of the dense bed 14 in the regenerator vessel 12 to add to the pressure in the upper part of the stripper vessel 26 so that the pressure at the bottom of the standpipe 152 is greater than the pressure at the bottom of the fluidized bed 14 in the regenerator 12 into which the standpipe 152 discharges.

The variables which are important in actual operations are catalyst holdup, catalyst-to-oil weight ratio and temperature in the reactor. With the present invention, the catalyst holdup in the reactor is established and the catalyst-to-oil weight ratio is established. The reactor temperature can be changed by changing the heat input with either the feed or the catalyst or both.

To minimize the control necessary to vary catalyst reactor holdup and catalyst-to-oil weight ratio in the simplified unit of the present invention, the reactor 10 has been designed as a dense phase riser with a fixed volume. This means that catalyst holdup in the reactor is a function only of density which can be controlled by the pressure balance maintained in the cracking unit.

The density of the upflowing suspension in transfer line reactor 10 produces a certain pressure drop in passing up through the reactor 10. More dense suspensions of catalyst passing up through reactor 10 will give greater pressure drops in the reactor 10 than less dense suspensions passing up through reactor 10.

The desired or selected pressure balance is roughly established by making a gross adjustment with the slide valve 76 to introduce catalyst particles into the reactor 10 and to approximate the desired density therein. Minor adjustment is then made with the differential pressure control system associated with valve 58 to obtain the desired or selected pressure drop across the reactor 10 and this establishes the selected density which can be maintained in the reactor 10.

With these two adjustments the available pressure drop across the reactor 10 is controlled or selected to a desired figure. The available pressure drop across reactor 10 establishes the density which can be maintained in the reactor 10 and this fixes the catalyst-to-oil weight ratio and the catalyst holdup.

As the catalyst-to-oil weight ratio has been fixed, the catalyst circulation will then be proportional to the oil feed rate.

To maintain or change the reactor temperature, the heat input to the reactor can be varied by changing the amount of oil introduced through line 25 into the regenerator 12 and/or by changing the oil feed temperature in line 88 with heat exchange.

As with most operating cracking units, no specific control is necessary for the operation of the stripper 26 or the regenerator 12. The steam flow rate to the stripper, which is the only controllable variable, is fixed by the selected restriction orifice 146'. The air rate to the regenerator is maintained substantially constant with minor variations in the carbon or coke make appearing as changes in excess oxygen in the flue gas leaving the regenerator.

The only automatic operating controller is the pressure drop control system associated with valve 58 on the flue gas stack 59 operating between the reactor 10 and the regenerator for controlling the stack valve 58.

If the pressure differential between the regenerator at 60 and the reactor at 61 decreases, the pressure differential control systems closes valve 58 slightly to increase the pressure in the regenerator to force more catalyst into the reactor through standpipe 74.

If the pressure differential between the regenerator at 60 and the reactor at 61 increases, the pressure differential control system opens valve 58 slightly to decrease the pressure in the regenerator and to reduce the amount of catalyst being passed into the reactor from standpipe 74.

As a specific example of a catalytic cracking unit of the present invention, the following details are enumerated. For a cracking unit of about 3400 b./d. total feed of gas oil having an API gravity of about 22.9 and which includes about 80% recycle oil, the transfer line reactor 10 is about 72 feet long from the region 86 at the bottom portion of the reactor to the outlet end of the horizontal section 64 of the reactor where it empties or discharges into the first cyclone separator 104.

The reactor is about 22 inches in internal diameter. The injection section 78 is about 16 inches in internal diameter and about 4 feet long. The upper end of the injection section 78 is swaged or expanded out to about 22 inches to be of the same size as the reactor 10 at region 86. The hexmesh lining 98 is carbon steel mesh having a thickness of about 3/4 of an inch and this lining is contracted to form about a 16 inch diameter throat 95 for the contacting devices 94 and 94a. The lining 98 is filled with dense refractory material.

About 450 pounds of steam per hour are introduced into the injection section 78 below grid 82 as fluidization steam for the hot regenerated catalyst introduced above grid 82 in the injection section 78 from standpipe 74. Standpipe 74 is about 12 inches in inside diameter. About 8000 pounds per minute of regenerated silica-alumina catalyst at a temperature of about 1115° F. are introduced into the injection section 78 from standpipe 74. The oil feed at a temperature of about 675° F. and about 700 pounds of steam per hour are introduced into the bottom of reactor 10 through line 88. The average temperature in the reactor 10 is about 950° F. The catalyst has a size particle distribution of about 13% of 0–40 microns, about 77% of 40–80 microns and about 10% of 80+ microns.

The density of the catalyst-oil vapor and steam mixture in the reactor 10 is about 7.5 pounds per cubic foot. The velocity of the upflowing catalyst-oil mixture in reactor 10 is about 14 feet/sec. at the lower portion of the reactor and about 20 feet/sec. just above the contacting device 94a. The lowest contacting device 94 is about 7 feet above the bottom 86 of reactor 10 and the next higher contacting device is about 15 feet above the bottom 86 of reactor 10. The next three contacting devices including the top one 94a are at 22, 30 and 40 feet, respectively, above the bottom 86 of reactor 10. The contacting devices are contracted to about a 16-inch diameter throat.

The velocity of the upflowing suspension at the throat of the contacting devices is about 30 feet/sec. at the lowest contacting device 94 and increases to about 40 feet/sec. at the highest contacting device 94a.

The pressure at the top of the reactor 10 is about 8.5 p.s.i.g. The holdup of catalyst in reactor 10 is about 0.5 ton and the catalyst circulation is about 4.0 tons per minute. The catalyst-to-oil weight ratio on total oil feed is about 10.4. The space velocity w./hr./w. (weight of oil per hour per weight of catalyst) is about 50.0. Total steam to reactor 10 and injection section 78 is about 1150 lbs./hour.

The cyclone separators 104, 118, 128 remove substantially all of the catalyst particles from the cracked vapors and steam and the separated catalyst particles are collected in diplegs 106, 124 and 132 and introduced into the upper portion of stripper 26. The two smaller diplegs feed into the main dipleg 106 from the first cyclone separator 104 which extends into the upper portion of the stripper and which is provided with the flapper valve or trickle valve 108 to maintain a seal on the cyclone separators and to prevent reverse catalyst or gas flow in the unit by providing a positive shutoff.

The stripper 26 comprises a 3 foot internal diameter pipe about 20 feet long. The stripper contains about 15 feet of disc and doughnut contacting devices in the lower section thereof. The pressure in the stripper is about 7.25 p.s.i.g. About 950 lbs. per hour of steam are passed through line 146 into the bottom of the stripper. The flow rate of the steam is controlled by restriction orifice 146 and the steam is introduced into the circular distributor 147. The steam passes upwardly at a superficial velocity of about 1.0 ft./sec. displacing entrained and/or adsorbed hydrocarbons from the catalyst particles. The temperature in the stripper vessel 26 is about 940° F. The density of the catalyst particles undergoing stripping in stripper vessel 26 is about 35 lbs./cu. ft.

The steam and stripped-out material leaves the top of the stripper vessel 26 through 3 inch balance line 148 and passes into line 126 leading to the tertiary cyclone separator 128. The lower pressure in the primary cyclone 104 makes the stripper pressure less than that in the regenerator and thus causes a difference in catalyst levels as shown at 144 in the stripper and at 16 in the regenerator 12. The higher catalyst level 144 in the stripper 26 combined with the velocity of the catalyst leaving the stripper 26 normally insures against any air flow from the regenerator into the stripper. Standpipe 152 is about 12 inches in inside diameter. About 8,000 pounds per minute of stripped catalyst are introduced into the regenerator 12 from standpipe 152.

The regenerator 12 is a 10-foot internal diameter, 35-foot straight side vessel which operates at a temperature of about 1125° F. and a top head pressure of about 9.5 p.s.i.g. About 4,700 standard cubic feet of dry air per minute are introduced into the bottom of the regenerator 12 through line 22. The superficial velocity of the air and gas passing up through the regenerator is about 2.1 feet/sec. and this keeps solid entrainment low enough to insure excellent solids recovery from the regenerator flue gas using two stages of cyclone separators. The density of the catalyst mixture in the regenerator 12 is about 28 lbs./cu. ft. The catalyst holdup in the regenerator is about 12 tons.

A twelve inch gate valve is used as the stack valve 58 to minimize the control necessary and to maintain the unit in pressure balance as will be presently described.

In this example, the pressure in the outlet line 54 from the regenerator secondary cyclone separator 44 is about 7.5 p.s.i.g. and the pressure in the stack below control valve 58 is about 6.5 p.s.i.g. The pressure in the reactor at the region 61 at the elbow 62 is about 8.5 p.s.i.g. and the internal pressure in the regenerator at the region 60 is about 9.5 p.s.i.g. The pressure differential between regions 60 and 61 is maintained at about one pound difference in this specific example.

The internal pressure in the top of the stripper 26 is about 7.25 p.s.i.g. and in the bottom of the stripper 26 is about 11 p.s.i.g. The pressure in the bottom of the regenerator 10 above grid 18 is about 12.0 p.s.i.g. The pressure just above the level 16 of the dense bed in the regenerator 12 is about 9.9 p.s.i.g.

The pressure in the standpipe 74 above slide valve 76 is about 13.5 p.s.i.g. and below the slide valve is about 11.6 p.s.i.g. The pressure at the bottom of transfer line reactor 10 at region 86 is about 11.6 p.s.i.g. The pressure at the bottom of line 152 leading from the stripper 26 into the regenerator 12 is about 12.0 p.s.i.g. so that catalyst flows from stripper 26 into the regenerator 12. The pressure at the bottom of the stripper 26 is built up by adding the pressure above the level 144 of catalyst in the stripper to the pressure built up by the head of dense fluidized catalyst of a density of about 35 lbs./cu. ft. extending from the level 144 to the outlet of line 152.

As pointed out above, the level 144 is higher than the level 16 of the catalyst in the regenerator and also the density of the fluidized catalyst in the regenerator is less than that in the stripper, that is, about 28 lbs./cu. ft. and the head of catalyst in the regenerator is less than that in the stripper 26.

For a unit having a total oil feed rate of about 3400 b./d., the unit is in the following pressure balance where the total catalyst inventory is 26,000 pounds, the catalyst to oil ratio is 10.4, and the average reactor temperature is 950° C., pressure at top of stripper 26 is 7.25 p.s.i.g. pressure at bottom of standpipe 152 is 12.0 p.s.i.g., pressure above grid 18 in regenerator 12 is 12 p.s.i.g., pressure at top of interior of regenerator 12 is 9.5 p.s.i.g., pressure in line 54 from regenerator secondary cyclone separator 44 is 7.5 p.s.i.g., pressure in line 54 ahead of waste heat boiler 56 is 6.5 p.s.i.g., pressure in standpipe 74 from regenerator 12 above slide valve 76 is 13.5 p.s.i.g., pressure in line below slide valve 76 is 11.6 p.s.i.g., pressure at bottom of reactor 10 at 86 is 11.6 p.s.i.g., pressure at the inlet to primary cyclone 104 is 8.5 p.s.i.g., pressure at outlet from tertiary cyclone 128 is 6.5 p.s.i.g.

For a larger unit having a total oil feed rate of about 9,800 b./d., the unit is in the following pressure balance where the total catalyst inventory is 75,000 pounds, the catalyst to oil ratio is 10.5, and the reactor temperature is 950° F., the pressure at top of stripper 26 is 12.5 p.s.i.g., pressure at bottom of stripper 26 is 13.7 p.s.i.g., pressure above grid 18 in regenerator 12 is 13.7 p.s.i.g., pressure at top of interior of regenerator 12 is 11.0 p.s.i.g., pressure in line 54 from secondary cyclone 44 is 9.0 p.s.i.g., pressure in standpipe 74 above valve 76 is 15.1 p.s.i.g., pressure in standpipe 74 below valve 76 is 121 p.s.i.g., pressure at bottom of reactor 10 at 86 is 12.1 p.s.i.g., pressure at inlet to primary cyclone 104 is 8.5 p.s.i.g., pressure at outlet from tertiary cyclone 128 is 6.7 p.s.i.g.

For this larger unit the reactor, the regenerator and stripper will be increased in size to utilize the larger amount of catalyst.

For different size units the pressure balance of the unit can easily be determined.

What is claimed is:

1. An elongated cylindrical transfer line catalytic cracking reactor having an inlet end and an outlet end and an unobstructed axial passageway, means whereby hydrocarbon vapors and solid particles are introduced into said transfer line inlet end and passed axially therethrough, solids separating means at the outlet end of said transfer line reactor into which said transfer line reactor directly discharges for separating solid particles from hydrocarbon vapors, said transfer line reactor being provided with a plurality of internal Venturi-shaped contacting devices of a smaller diameter than the internal diameter of said transfer line reactor and spaced one from another along the length of said transfer line reactor and extending inwardly from the inner wall of said transfer line reactor whereby improved cocurrent contacting between the hydrocarbon vapors and solid particles is obtained and the velocity of the flow of the hydrocarbon vapors and the solid particles is increased as they pass through said Venturi-shaped devices and long back-mixing solid particles paths along the inner wall of said transfer line reactor are eliminated.

2. An elongated cylindrical transfer line catalytic cracking reactor having an inner lining, an inlet end and an outlet end and an unobstructed axial passageway and provided with a plurality of internal contacting devices in spaced relation one above the other along the length of said reactor and being of a smaller diameter than the reactor, each of said contacting devices being formed by contracting said inner lining at a plurality of spaced regions to form a Venturi throat contacting device extending inwardly from the inner lining at each region.

3. An elongated cylindrical transfer line catalytic cracking reactor provided with an inner lining and having an inlet end and an outlet end and an unobstructed axial passageway ad formed with a plurality of longitudinally spaced inwardly extending Venturi throat contacting device, each of said contacting devices being formed by contracting said inner lining to a smaller diameter than said reactor to form a Venturi throat.

4. An elongated cylindrical transfer line catalytic cracking reactor having an inlet end and an outlet end and an unobstructed axial passageway and provided with a plurality of internal Venturi-shaped constrictions of a smaller diameter than the internal diameter of said transfer line reactor, said Venturi-shaped constrictions being arranged one above the other along the length of said transfer line reactor.

References Cited

UNITED STATES PATENTS

| | | | |
|---|---|---|---|
| 2,288,613 | 7/1942 | Dill | 208—176 X |
| 2,302,209 | 11/1942 | Goddin. | |
| 2,427,820 | 9/1947 | Thomas. | |
| 2,488,027 | 11/1949 | Page | 23—1 X |
| 2,584,378 | 2/1952 | Beam | 208—164 |
| 2,589,124 | 3/1952 | Packie | 208—164 |
| 2,614,653 | 10/1952 | Penick et al. | 208—161 XR |
| 2,820,072 | 1/1958 | Wood et al. | |
| 2,838,063 | 6/1958 | Weits et al. | 23—288.3 X |
| 2,895,811 | 7/1959 | Schaaf | 23—288.3 |
| 2,900,324 | 8/1959 | Patton et al. | 208—164 X |
| 2,901,331 | 8/1959 | Held et al. | 23—288.3 |
| 3,026,186 | 3/1962 | Coty | 23—288.3 |

JOSEPH SCOVRONEK, *Acting Primary Examiner.*